(12) United States Patent
Lee

(10) Patent No.: US 12,024,120 B2
(45) Date of Patent: Jul. 2, 2024

(54) ETHERNET-BASED VEHICLE CONTROL SYSTEM AND METHOD

(71) Applicant: GARIN SYSTEM Co., Ltd., Incheon (KR)

(72) Inventor: Yun Sub Lee, Incheon (KR)

(73) Assignee: GARIN SYSTEM Co., Ltd. (KR)

( * ) Notice: Subject to any disclaimer, the term of this patent is extended or adjusted under 35 U.S.C. 154(b) by 504 days.

(21) Appl. No.: 17/231,006

(22) Filed: Apr. 15, 2021

(65) Prior Publication Data

US 2021/0323503 A1    Oct. 21, 2021

(30) Foreign Application Priority Data

Apr. 21, 2020    (KR) .................... 10-2020-0048024

(51) Int. Cl.
*B60R 25/20*     (2013.01)
*B60R 16/02*     (2006.01)
*B60R 16/023*    (2006.01)
*H04L 67/12*     (2022.01)
*H04L 67/125*    (2022.01)
*H04L 12/40*     (2006.01)

(52) U.S. Cl.
CPC ........ *B60R 25/209* (2013.01); *B60R 16/0231* (2013.01); *H04L 67/125* (2013.01); *H04L 2012/40215* (2013.01); *H04L 2012/40273* (2013.01)

(58) Field of Classification Search
CPC .............. B60R 16/0231; B60R 25/209; H04L 12/4625; H04L 2012/40215; H04L 2012/40273; H04L 67/125; H04L 67/56
See application file for complete search history.

(56) References Cited

U.S. PATENT DOCUMENTS

| | | |
|---|---|---|
| 4,039,087 A | 8/1977 | Sandvick, Sr. |
| 4,098,096 A | 7/1978 | Chard et al. |
| 5,612,578 A | 3/1997 | Flick |
| 5,719,551 A | 2/1998 | Flick |
| 6,011,460 A | 1/2000 | Flick |
| 6,275,147 B1 | 8/2001 | Flick |
| 6,346,876 B1 | 2/2002 | Flick |
| 6,756,885 B1 | 6/2004 | Flick |
| 10,391,883 B2 * | 8/2019 | Choi ................. B60L 58/31 |
| 11,481,736 B2 * | 10/2022 | Cammack ........... G07C 5/0816 |

(Continued)

FOREIGN PATENT DOCUMENTS

KR    10-2014-0124255 A    10/2014

*Primary Examiner* — Tyler J Lee

(57) ABSTRACT

Disclosed is an Ethernet-based vehicle control system and method. The Ethernet-based vehicle control system (method) according to the present invention includes: a router for connecting a vehicle internal network and a vehicle external network; a vehicle electronic element connected to and communicating with the router; and a third-party module newly mounted on a vehicle to control the vehicle electronic element, and the third-party module may be controlled by a remote controller through the vehicle external network. Here, the third-party module may be a remote start control device. According to the present invention, since a third-party module can be freely installed and replaced based on Ethernet, various services related to a vehicle may be realized through a vehicle external network.

10 Claims, 13 Drawing Sheets

(56) References Cited

U.S. PATENT DOCUMENTS

| | | | |
|---|---|---|---|
| 2008/0269979 A1* | 10/2008 | Hermann | H04L 41/082 |
| | | | 701/29.6 |
| 2011/0256904 A1* | 10/2011 | Simmons | B60R 25/00 |
| | | | 455/556.1 |
| 2013/0073121 A1* | 3/2013 | Kim | B60R 25/209 |
| | | | 701/2 |
| 2013/0268139 A1* | 10/2013 | Endo | F02N 11/101 |
| | | | 701/2 |
| 2014/0371951 A1* | 12/2014 | Michael | F02N 11/0807 |
| | | | 701/2 |
| 2016/0071509 A1* | 3/2016 | Zhao | G10L 13/04 |
| | | | 704/260 |
| 2018/0118050 A1* | 5/2018 | Choi | G05D 1/0022 |
| 2019/0203630 A1* | 7/2019 | Dudar | B60W 50/0097 |
| 2019/0215370 A1* | 7/2019 | Granda | H04L 67/12 |
| 2021/0116907 A1* | 4/2021 | Altman | G05D 1/0038 |
| 2021/0166198 A1* | 6/2021 | Cammack | G06Q 10/20 |
| 2021/0172351 A1* | 6/2021 | Cammack | G07C 5/008 |
| 2021/0366278 A1* | 11/2021 | Park | G08G 1/093 |

\* cited by examiner

ETHERNET-BASED VEHICLE CONTROL SYSTEM AND METHOD

CROSS-REFERENCE TO RELATED APPLICATIONS

This application claims priority to and the benefit of Korean Patent Application No. 10-2020-0048024 filed in the Korean Intellectual Property Office on Apr. 21, 2020, the entire contents of which are incorporated herein by reference.

BACKGROUND OF THE INVENTION

Field of the Invention

The present invention relates to a vehicle control technique. More specifically, the present invention relates to an Ethernet-based vehicle control system and method for controlling a vehicle based on Ethernet.

Background of the Related Art

Bosch Co., a corporation located at Gerlingen-Schillerhöhe, GERMANY, has developed a Controller Area Network (CAN) for constructing an efficient vehicle internal network. The CAN provides an economical and stable network since it can control a plurality of modules with one interface. In addition to the CAN, an extended CAN that increases the data transmission rate by adding an ID has been proposed. CAN communication is performed in a way of processing broadcast information by a corresponding vehicle electronic element while the vehicle electronic element is connected to the CAN bus. For example, when a corresponding engine control unit (ECU) broadcasts a door open signal to the CAN bus in response to pressing a door open button of a vehicle remote control key, a door lock module related to the door open signal performs door open operation. However, the other vehicle electronic elements unrelated to the door open signal bypass the door open signal. Meanwhile, the CAN has been developed in a very closed environment due to the specificity of being applied to vehicles, and techniques for integrating the CAN with a vehicle external network are proposed to compensate for this shortcoming.

On the other hand, as the functions of vehicles are advanced, various electronic control units (ECUs) are continuously mounted, and network complexity of vehicles increases. That is, as the vehicles change from mechanical types to electronic types, the number of electronic control units, controllers, sensors, and the like mounted on the vehicles increases. Accordingly, it is difficult to process signals quickly and stably using the communication speed and bandwidth of the CAN. Although FlexRay® automotive network communications protocol, which is mainly used for brake systems and cruise controls, has been proposed to solve this problem, there are problems such as increase in the number of connecting lines and increase in development cost.

Therefore, Ethernet for vehicles is spotlighted as an alternative to the FlexRay®. Ethernet for vehicles presents infinite possibility of connected cars. The Ethernet may transmit and receive a large amount of data and also develop the vehicle infotainment environment greatly. In addition, the Ethernet for vehicles may be regarded as a prerequisite condition for operating an advanced driver assistance system (ADAS) of connected cars, autonomous vehicles or the like.

Meanwhile, genuine electronic control units, controllers, sensors, and the like may be replaced for management of vehicles, or a separate third-party module may be added to support various functions (here, the third-party module means equipment manufactured in accordance with a specification provided by developers other than the companies officially developing hardware or software). When a third-party module is installed based on the CAN, a vehicle may be controlled (for example, remote start) in a way of bypassing the ECU. However, when connected cars, autonomous vehicles or the like are implemented based on the Ethernet, since security functions that block hacking or the like from vehicle external networks will be strengthened through a gateway, operation of the third-party module may be blocked or even disabled.

SUMMARY OF THE INVENTION

Therefore, the present invention has been made in view of the above problems, and it is an object of the present invention to provide an Ethernet-based vehicle control system and method, which can achieve smooth driving of a third-party module through a clone or the like of a Media Access Control (MAC) address in response to addition of the third-party module on the basis of Ethernet.

To accomplish the above object, according to one aspect of the present invention, there is provided an Ethernet-based vehicle control system comprising: a router for connecting a vehicle internal network and a vehicle external network; a vehicle electronic element connected to and communicating with the router; and a third-party module newly mounted on a vehicle to control the vehicle electronic element, wherein the third-party module may be controlled by a remote controller through the vehicle external network. Here, the third-party module may be a remote start control device.

At this point, the remote start control device includes: a remote start receiver for receiving a remote start signal transmitted from a remote start transmitter through the vehicle external network; and a remote start controller for controlling engine start through communication with at least one vehicle electronic element related to engine start of the vehicle, wherein the remote start controller may be connected to the remote start receiver and respond to the remote start receiver.

In addition, the remote start control device includes: a remote start receiver for receiving a remote start signal transmitted from a remote start transmitter through the vehicle external network; and a remote start controller for controlling engine start through communication with at least one vehicle sensor related to engine start of the vehicle, wherein the remote start controller may be connected to the remote start receiver and respond to the remote start receiver.

In addition, the remote start control device includes: a remote start receiver for receiving a remote start signal transmitted from a remote start transmitter through the vehicle external network; and a remote start controller for controlling engine start through communication with at least one vehicle controller related to engine start of the vehicle, wherein the remote start controller may be connected to the remote start receiver and respond to the remote start receiver.

On the other hand, there is provided an Ethernet-based vehicle control method, the method for controlling a vehicle using a router for connecting a vehicle internal network and a vehicle external network, and a third-party module newly mounted on a vehicle including a vehicle electronic element connected to and communicating with the router to control the vehicle electronic element, wherein the third-party module may be controlled by a remote controller through the vehicle external network.

At this point, the third-party module may include a remote start receiver for receiving a remote start signal transmitted from a remote start transmitter through the vehicle external network; and a remote start controller for controlling engine start through communication with at least one vehicle electronic element related to engine start of the vehicle, wherein the remote start controller may be connected to the remote start receiver to perform remote start control in response to the remote start receiver.

At this point, the remote start control includes the steps of: receiving a vehicle signal from the remote start transmitter; controlling engine start, by the remote start controller, through communication with at least one vehicle electronic element related to engine start of the vehicle; and starting a vehicle engine based on the signal received from the remote start transmitter and based on communication with at least one vehicle electronic element related to engine start of the vehicle.

DESCRIPTION OF SYMBOLS

Figure 1:
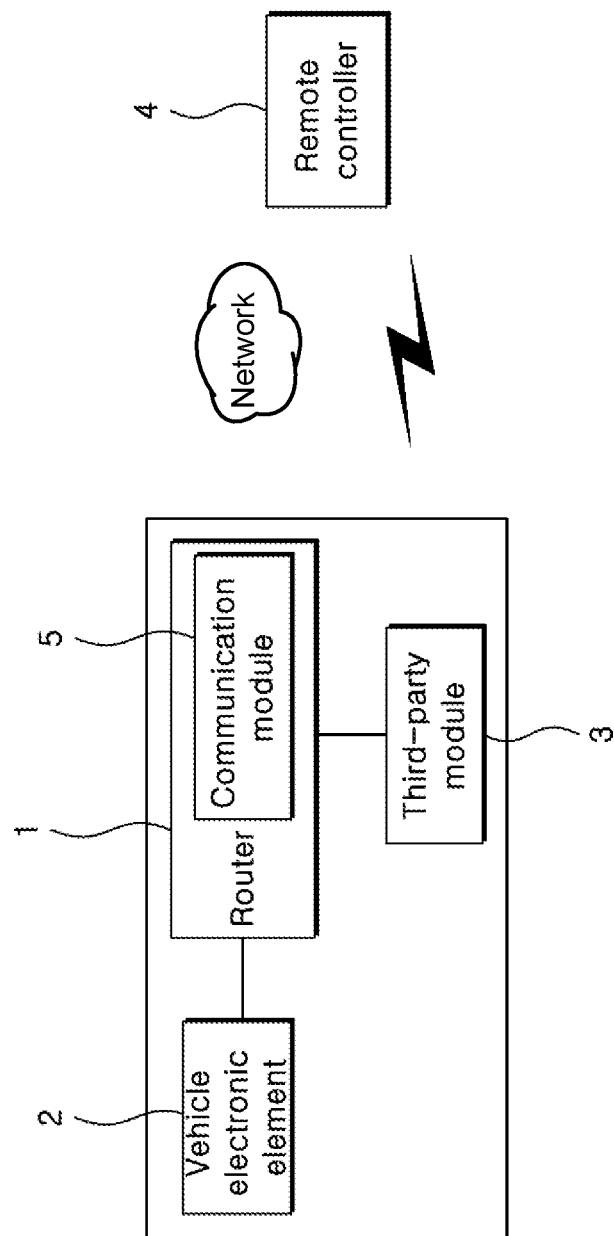
FIG. 1 is a conceptual view showing an Ethernet-based vehicle control system according to a first embodiment of the present invention.

1: Router
2: Vehicle electronic element
3: Third-party module
4: Remote controller
5, 6: Communication module

DETAILED DESCRIPTION OF THE PREFERRED EMBODIMENT

Hereinafter, the present invention will be described in detail with reference to preferred embodiments of the present invention and the accompanying drawings, and it will be described on the premise that the same reference numerals refer to the same components.

In the detailed description or claims of the present invention, when any one component "includes" another component, it is not construed as being limited to only the component unless otherwise stated, and it should be understood that the component may further include other components.

In addition, in the detailed description or claims of the present invention, the components named as "~ means", "~ unit", "~ module", or "~ block" refer to units that process at least one or more functions or operations, and each of these components may be implemented by software, hardware, or a combination of these.

Hereinafter, an example in which the Ethernet-based vehicle control system and method of the present invention is implemented will be described through a specific embodiment.

FIG. 1 is a view showing the configuration of an Ethernet-based vehicle control system according to a first embodiment of the present invention.

Referring to FIG. 1, an Ethernet-based vehicle control system of the present invention basically includes a router 1 for connecting a vehicle internal network and a vehicle external network based on Ethernet, and a vehicle electronic element 2 connected to and communicating with the router 1, and in the present invention, a third-party module 3 newly mounted on the vehicle to control the vehicle electronic element 2 is included.

Meanwhile, the router 1 may include a communication module 5 for communicating with a remote controller 4 through the vehicle external network. As the communication module 5, a short-range communication module including Wi-Fi, Bluetooth, ZigBee, short-range RF and the like and a mobile communication module including GSM/GPRS, UMTS/WEDGE/HSDPA, CDMA and the like may be selectively used.

In addition, the vehicle electronic element 2 is an electronic equipment part that is set in a genuine state for each trim level when the vehicle is manufactured, and includes an electronic control unit (ECU), controllers, sensors and the like for controlling the transmission, door locks and the like which basically constitute the vehicle. For example, in the case of a trim level without including a remote start controller as an option, a remote start controller may be added as a separately and newly mounted third-party module 3.

Figure 2:
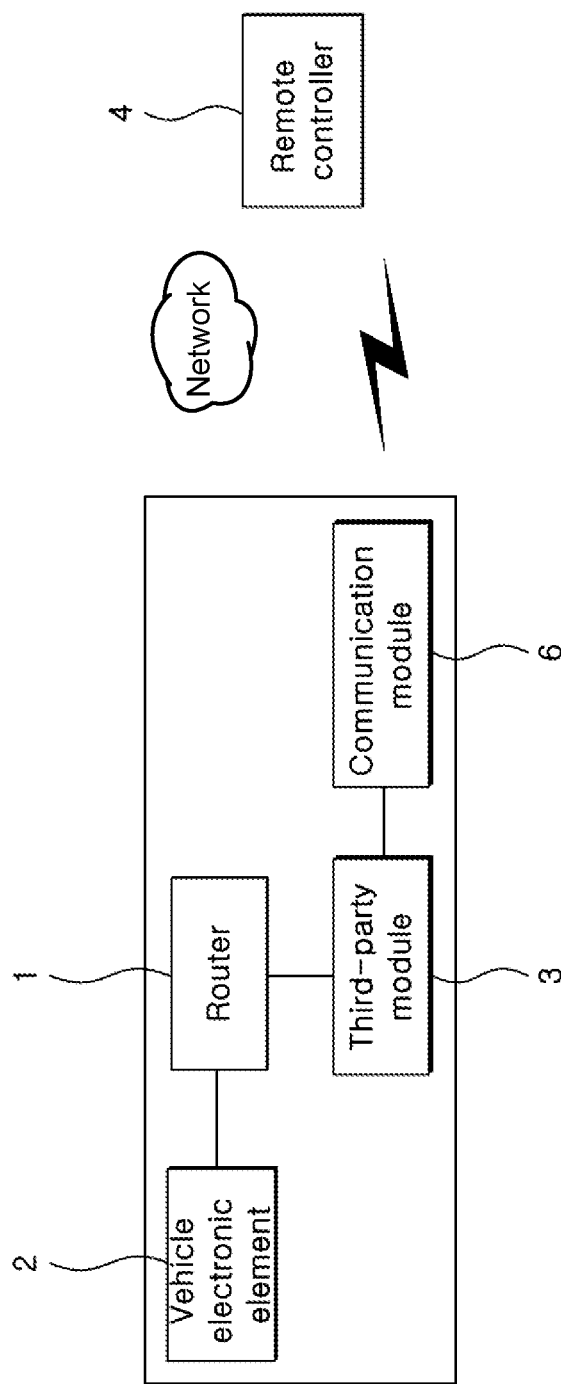
FIG. 2 is a conceptual view showing an Ethernet-based vehicle control system according to a second embodiment of the present invention.

FIG. 2 is a view showing the configuration of an Ethernet-based vehicle control system according to a second embodiment of the present invention.

Hereinafter, duplicate description of the same configuration and configurations performing the same function will be omitted in the description of drawings.

Referring to FIG. 2, compared with the Ethernet-based vehicle control system of FIG. 1, the difference is that a communication module 6 for third-party module, which communicates with the remote controller 4 through the vehicle external network, is connected to the third-party module 3. That is, compared with the first embodiment described above, the router 1 proposed in this embodiment may not include a communication module.

Figure 3:
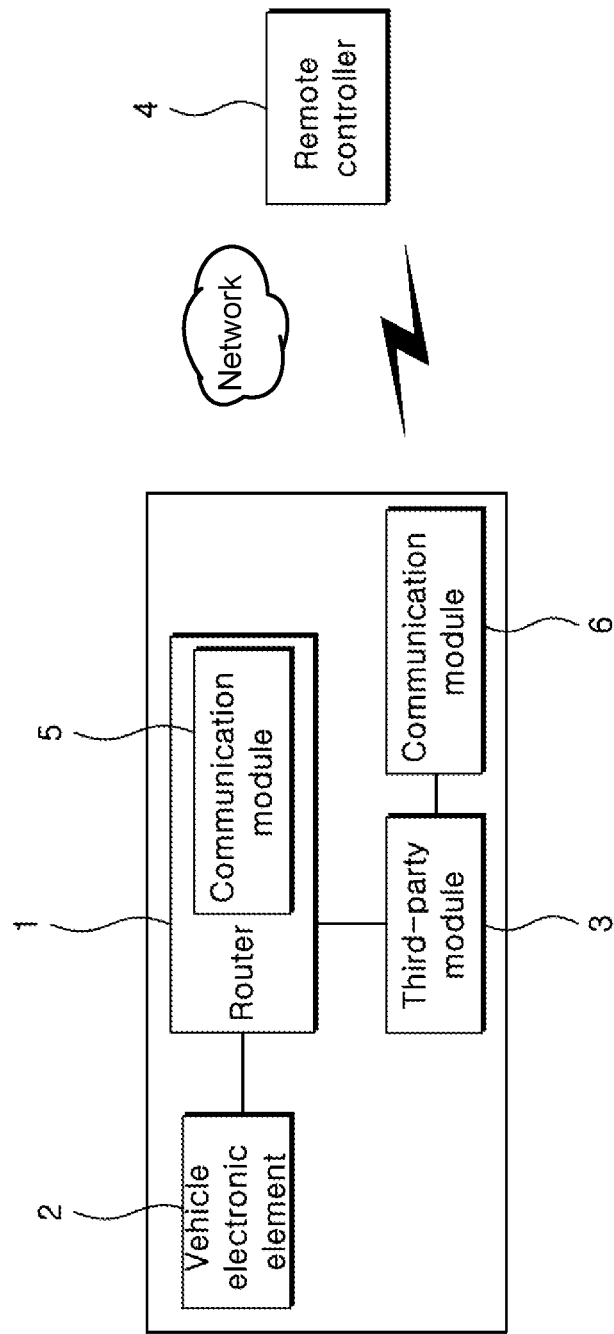
FIG. 3 is a conceptual view showing an Ethernet-based vehicle control system according to a third embodiment of the present invention.

FIG. 3 is a view showing the configuration of an Ethernet-based vehicle control system according to a third embodiment of the present invention.

Referring to FIG. 3, compared with the Ethernet-based vehicle control system of FIG. 1, a communication module 6 for third-party module, which communicates with the remote controller 4 through the vehicle external network, may be additionally connected to the third-party module 3.

For example, the communication module 5 included in the router 1 proposed in this embodiment may use a mobile communication network while the vehicle travels, and the communication module 6 for third-party module may use a local area network in a parking state. Of course, the method of using the communication module 5 included in the router 1 and the communication module 6 for third-party module may be randomly selected and controlled by the user.

Meanwhile, although a case in which the vehicle electronic element 2 and the third-party module 3 proposed in the first to third embodiments are individually connected to the router 1 is described, the third-party module 3 may be formed between the vehicle electronic element 2 and the router 1. Through the configuration like this, the third-party module 3 may perform four functions described below.

Meanwhile, the third-party module 3 proposed in the first to third embodiments described above may perform four functions described below.

First, the third-party module 3 may convert a packet transmitted from the vehicle external network into a signal required by the vehicle electronic element 2 and transmit the signal to the vehicle electronic element 2 so that the vehicle electronic element 2 may perform a corresponding operation.

Second, the third-party module 3 may directly control the vehicle electronic element 2 in response to a packet transmitted from the vehicle external network.

Third, the third-party module 3 may bypass input and output packets to the vehicle electronic element 2 and the vehicle external network as they are.

Fourth, the third-party module 3 may ignore the packets output from the vehicle electronic element 2 and modulate and transmit corresponding packets to the vehicle electronic element 2 and the vehicle external network, or contrarily, the third-party module 3 may delete the packets input into the vehicle electronic element 2 and modulate and transmit corresponding packets to the vehicle electronic element 2.

As all the data transmitted and received between the vehicle electronic element 2 and the router 1 pass through the third-party module 3 in this way, the third-party module 3 may control the input and output signals. That is, the third-party module 3 may convert a packet to match a corresponding vehicle in response to a request signal, directly control a corresponding vehicle electronic element 2 by cloning the MAC address of the vehicle electronic element 2 in response to a request signal, bypass input and output signals, or override input and output signals.

Meanwhile, for example, a remote start controller may be mounted as the third-party module 3 proposed in the first to third embodiments described above. That is, when a remote start function is not included in the trim level of a vehicle, the remote start controller may be installed in the vehicle later. In response to installation of the remote start controller, the remote start controller broadcasts a search message to the router 1. At this point, the search message includes a MAC address and information related to remote start.

Accordingly, the router 1 assigns an IP address in response to the received search message, and broadcasts an IP providing message to the remote start controller. The IP providing message may include the MAC address, the assigned IP address, the IP address of the router 1, and the like. A process of registering the MAC address in the router 1 is performed in this way, and accordingly, the router 1 may perform routing corresponding to input and output signals based on a MAC address table in which the relation with previously registered MAC addresses is established.

Here, although it may vary according to the trim level of a vehicle, generally, a vehicle may start only when a vehicle remote control key is located inside the vehicle. However, when a remote start controller is mounted, remote start should be allowed although the vehicle remote control key is not located inside the vehicle.

To this end, when a remote vehicle start signal is transmitted through the vehicle external network, the third-party module 3 arbitrarily generates a virtual signal indicating that the vehicle remote control key is recognized inside the vehicle, a virtual signal indicating that the start button is pressed by the vehicle remote control key, and a virtual signal indicating that the transmission is at a specific position (e.g., Park), and informs the vehicle electronic element 2 of the virtual signals although the vehicle remote control key is not located inside the vehicle. Accordingly, start control by the vehicle electronic element 2 will be performed. That is, the third-party module 3 arbitrarily generates a signal indicating that the vehicle remote control key is recognized inside the vehicle and the start button is pressed by the vehicle remote control key, and inform the generated signal to the vehicle electronic element 2 related to remote start, in response to the remote vehicle start signal.

At this point, in the present invention, in order to enhance security, when the third-party module 3 transmits a packet (command signal) on the Ethernet, other vehicle electronic elements 2 of the vehicle internal network may confirm the MAC address and check whether a registered vehicle electronic element 2 has transmitted the packet. To this end, the third-party module 3 may use a method such as cloning the MAC address. Of course, the security may also be enhanced in other ways.

Hereinafter, a specific embodiment of the Ethernet-based vehicle control system of the present invention will be described, and in this embodiment, a case of applying a remote start controller to the remote start control device as the third-party module 3 will be described. In addition, for convenience of explanation, it will be described based on the configuration of the first embodiment of FIG. 1. Of course, it is natural that various systems other than the remote start controller may be applied to the present invention.

Figure 4:
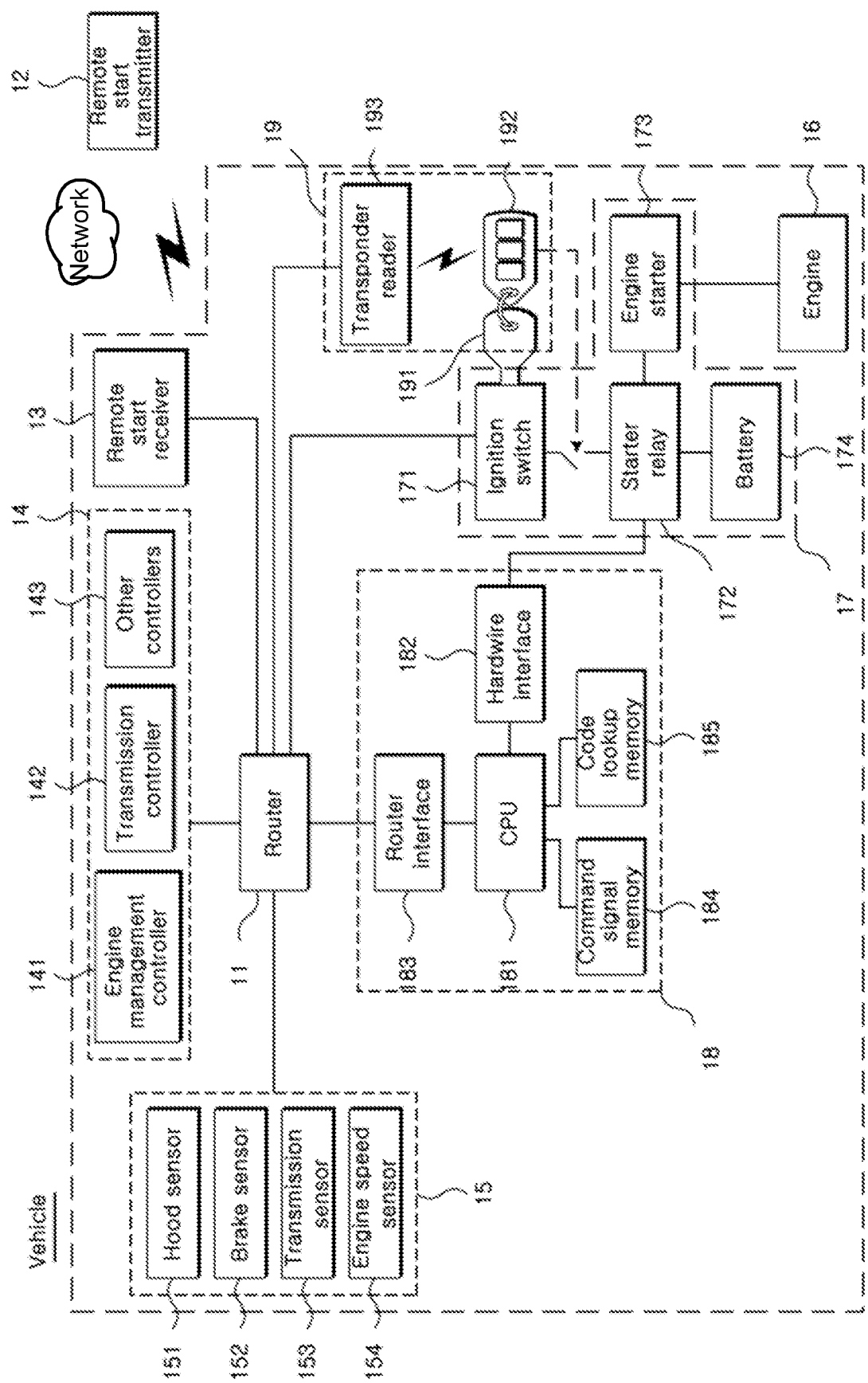
FIG. 4 is a block diagram showing a control circuit of a remote start control device connected to a router and other hardwire devices as a first application example of the present invention.

FIG. 4 is a view showing the configuration of a remote start control device as an application example of the present invention.

Referring to FIG. 4, the remote start control device illustrated in the present invention operates based on the Ethernet, and thus a router 11 connecting a vehicle internal network and a vehicle external network is basically installed in the vehicle.

Accordingly, a remote start receiver 13 for receiving a signal transmitted from a remote start transmitter 12 through short-range communication or mobile communication, a controller group 14 for controlling vehicle electronic elements, a sensor group 15 for sensing vehicle states, an engine start circuit 17 for starting a vehicle engine 16, and a remote start controller 18 for controlling engine start may be connected to the router 11.

As described, the remote start controller 18 is connected to the router 11 to communicate with at least one or more vehicle electronic elements. That is, as the remote start controller 18 is connected to the remote start receiver 13 through the router 11, start of the vehicle is possible in response to a signal transmitted from the remote start transmitter 12.

Remote start means initially starting the vehicle engine 16 and maintaining an idle state even when the vehicle owner is absent. In addition, whether the remote start controller 18 is able to allow start of engine and continue idling may be based on a plurality of predetermined conditions in the vehicle. Corresponding conditions will be described below in detail.

Meanwhile, the controller group 14 related to start of the vehicle engine 16 may include at least one controller such as an engine management controller 141 or a transmission controller 142. In addition, one or more other controllers 143 may communicate with the remote start controller 18.

In addition, optionally or additionally, the sensor group 15 related to start of the vehicle engine 16 may include at least one vehicle sensor 151 to 154. For example, the vehicle sensors 151 to 154 may be at least one among a hood sensor 151, a brake sensor 152, a transmission sensor 153, and an engine speed (RPM) sensor 154. In addition, other sensors related to remote start may also be applied.

The remote start controller 18 includes a central processing unit (CPU) 181 capable of performing signal processing and logic functions needed to control starting, subsequent driving or stopping of the vehicle engine 16. For example, the vehicle engine 16 may be prevented from being started or stopped when the gear shift lever is in a position other than the Park or when a gear shift is made. Similarly, the engine may be shut down when the engine RPM exceeds a predetermined value. In addition, an engine starter 173 may operate only up to an engine RPM indicating that the engine is started. When the vehicle hood is open, operation or stopping of the vehicle engine 16 may be prevented. In addition, many other vehicle states may be taken into account by the remote start controller 18. Further details related to the logical operation of the remote start controller 18 based on the exemplary conditions of the vehicle electronic elements may be found in U.S. Pat. No. 4,098,096. It relates to U.S. Pat. No. 5,612,578 of Drew.

Generally, a vehicle includes the engine start circuit 17 shown in the lower right part of FIG. 4. The engine start circuit 17 may include an ignition switch 171, a starter relay 172 connected to the ignition switch 171, and a vehicle battery 174 for supplying power to the engine starter 173.

The vehicle may also include a security immobilizer circuit 19 connected to the engine start circuit 17 as shown in the figure. The security immobilizer circuit 19 includes, for example, a passive transponder 192 carried in the neighborhood of an ignition key 191, and a transponder reader 193 for supplying power and reading coded signals from the passive transponder 192. Since such a security immobilizer circuit 19 is a well-known technique, detailed description thereof will be omitted. The remote start controller 18 may include a hardwire interface 182 connected to the immobilizer to bypass this circuit when remote start is needed. Accordingly, the engine start circuit 17 may be activated in response to presentation of a properly coded passive transponder 192 in the proximity of the transponder reader 193.

Of course, other types of security immobilizer circuits 19 may be used in other embodiments. For example, engine ignition may be deactivated by the engine management controller 141 unless a predetermined packet is generated by the transponder reader 193 and delivered to the router 11. In such a system, a packet may be generated through a router interface 183 of the remote start controller 18 so that drive of the transponder immobilizer may be effectively bypassed. The router interface 183 includes a circuit for interfacing in an appropriate signal level and format to perform Ethernet-based communication.

In another example, the coded resistor key approach described in the Drew's patent allows remote start in a way of selectively bypassing by the remote start controller 18. Other security immobilizer circuits 19 and devices may also be easily bypassed to enable the remote start.

The remote start transmitter 12 may be a small portable unit including a housing, a function control switch installed in the housing to be carried, a battery installed in the housing, and a related transmitter circuit. Generally, this type of remote handheld transmitter may be used in an existing remote start control device. Communication from the remote start transmitter 12 to the remote start receiver 13 in a vehicle is generally performed over a direct radio frequency link, i.e., has no intervening communication link. However, in other embodiments, the remote start transmitter 12 and the remote start receiver 13 may indirectly communicate through another communication infrastructure such as satellite or cellular communication, public switched telephone network (PSTN), or the World Wide Web or the Internet as described above.

In addition, the remote start transmitter 12 may include one or more base station transmitters that can be provided by, for example, a satellite transmitter or a cellular phone transmitter. Such base station transmitters may also be connected to other communication infrastructures.

In some embodiments, the remote start control device may optionally include a remote receiver (not shown) in the form of a small handheld device carried by a user or at least one base station receiver cooperating with a remote transmitter (not shown) in the vehicle to provide state information to the user in connection with remote start.

In the remote start control device shown in the figure, it is shown that various sensors 151 to 154 are connected to and communicated with the router 11. However, in another embodiments, one or more of these sensors may be applied to various controllers 141 to 143 that may have its own hardwire interface 182 for a specific signal or function.

The remote start controller 18 includes one or more memories 184 and 185 connected to the CPU 181. Although the memories 184 and 185 are shown as separate devices, the memories may be combined as a single device. Alternatively, the memories may be embedded in an integrated circuit the same as the processing circuit of the CPU 181.

Meanwhile, as another embodiment of the present invention, compatibility with other types of vehicles may be provided. Like this, the remote start controller 18 may have a feature capable of functioning as a multi-vehicle compatible remote start controller 18. The remote start controller 18 having these optional features may generate at least one command signal set for at least one vehicle electronic element. The one or more command signal sets may include one or more work command signals and one or more non-work command signals for a given vehicle to provide command compatibility with a plurality of different vehicles.

In addition, in order to read the communication from the vehicle electronic element, the remote start controller 18 may stores a series of device codes for a given vehicle electronic element for a plurality of different vehicles, and the router 11 may confirm the code of a corresponding vehicle electronic element and determine whether or not the code matches. Compatibility with a plurality of different vehicles is provided between the read device code and the stored device code. Here, the Media Access Control (MAC) address may be used as the device code.

Figure 5:
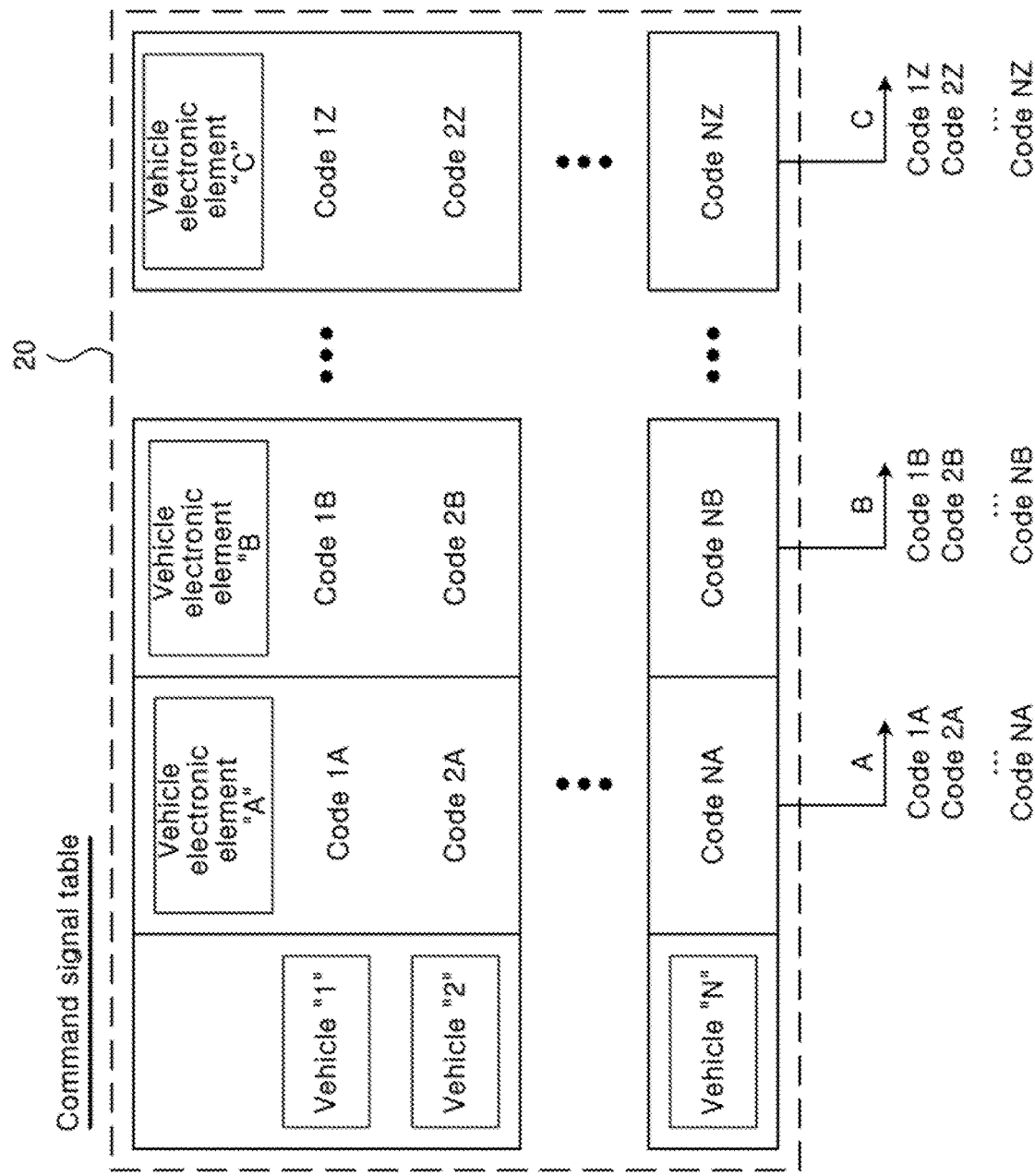
FIG. 5 is a view showing a command signal table generated by a router in the remote start control device of FIG. 4.

A vehicle includes a plurality of electrical and electronic devices 141 to 143 and 151 to 154 that can be controlled, and/or their states may be read through the router 11. The remote start controller 18 may provide multi-vehicle compatibility through unidirectional or bidirectional communication using the router 11. In FIG. 5, the process of driving or generating a communication signal by the router 11 will be described in detail. The remote start controller 18 includes, for example, a command signal memory 184, and a router interface 183 capable of providing bidirectionality of communication.

According to an embodiment of the present invention, the remote start controller 18 preferably generates at least one command signal set in the router 11 for at least one vehicle electronic element. The one or more command signal sets preferably include one or more work command signals and one or more non-work command signals for a given vehicle to provide compatibility with a plurality of different vehicles. In other words, a plurality of signals or codes may be generated by the router 11, and only a code for a given vehicle and device may allow an operation or a response from the vehicle electronic element. This provides comparatively simple and direct access for interfacing or cooperating with a vehicle having the router 11, and the remote start controller 18 is easily compatible with a plurality of different vehicles. Typically, since it is preferable to interface with a plurality of vehicle electronic elements, the remote start controller 18 may generate a command signal set for each vehicle electronic element.

The multi-vehicle compatibility provided by the remote start controller 18 is particularly easy in aftermarket remote start control devices. The interface capability through the router 11 also significantly reduces complexity of wiring needed for interfacing with related vehicle electronic elements.

The remote start controller 18 may sequentially generate different command signals (active and inactive) for intended vehicle electronic elements. For example, in order to guarantee effective communication even when a noise exists, the remote start controller 18 may generate a command signal set as many as a plurality of times, e.g., 2 to 5 times. In order to communicate effectively, it needs to be balanced with traffic congestion in the router 11 as much as possible.

Now, it will be described in detail with reference to the diagram of FIG. 5. In FIG. 5, the operation of the remote start controller 18 is additionally described. The remote start controller 18 may operate by arranging a common table 20 in the command signal memory 184 as shown in the figure. For example, when it is determined that an operation such as activating the starter relay 172 needs to be performed, the CPU 181 will identify an appropriate column among the column marked as "Vehicle Electronic Element A" to the column marked as "Vehicle Electronic Element Z" in the table 20. For example, the appropriate column may be "Vehicle electronic element B", and in this case, the CPU will read the memory location of this column to generate an appropriate code set for the router 11 to operate the starter relay 172 for each of N vehicles. Of course, only one of the codes will be an operating code, and the other codes will not perform a corresponding vehicle function. For example, when a vehicle in which the remote starting controller 18 is installed is a remotely started vehicle, only code 2B will operate the starter relay 172.

Actually, a coded signal may be compatible with a specific router 11. The code may be a binary code, and to more easily express for convenience, it may be simply expressed as a corresponding hexadecimal code. For example, a code for unlocking all vehicle doors of the 1995 Jeep Grand Cherokee is 03868004, and the code is 0422A00400 for the 2000 Jeep Grand Cherokee. Such codes may be obtained directly from the manufacturers, or may be read from the router 11 using one among a plurality of commercially available diagnostic tools.

The command signal set may be repeated as schematically shown in the lower part of the table 20 as described above. Of course, although the memory 184 may actually store the codes, data for generating the command signal set may be stored. This means that a specific part of a code, e.g., the preamble or some other parts, is common to several vehicles and/or several vehicle electronic elements.

Both the number of vehicles and the number of devices to be controlled using the multi-vehicle compatibility of the remote start controller 18 may be relatively large to cover a substantial portion of the vehicle market. In addition, optionally, the concept of multi-command signal may be easily used to provide compatibility for the electronic elements of two vehicles and a single vehicle.

Hereinafter, another communication direction will be described with reference to FIGS. 6 and 7. Particularly, the reverse direction reading of a signal from the router 11 is described. Since many components are the same as those described above, duplicate descriptions will be omitted. In the illustrated embodiment, the CPU 181 is connected to a code lookup memory 185.

Compatibility of reading a code for a vehicle electronic element in a plurality of vehicles and determining a message or its contents may be used alone or in combination with compatibility for recording or generating a signal by the router described above. More specifically, the remote start controller 18' stores a series of device codes for a given vehicle electronic element for a plurality of different vehicles, reads a device code from the router 11, and determines whether the read device code and the stored device code match in order to provide compatibility with the plurality of different vehicles. This configuration provides a comparatively simple and direct access for interfacing with a vehicle having the router 11.

The remote start controller 18 may include a code lookup memory 185 for the stored device codes, and a processor or a CPU 181 that cooperates with the memory to determine whether the read device code and the stored device code match. The at least one vehicle electronic element may include a plurality of vehicle electronic elements, and accordingly, the memory 185 of the multi-vehicle compatible controller 18 preferably stores a device code set for each of the plurality of vehicle electronic elements.

Hereinafter, the feature of the lookup table of the remote start controller 18 will be described in more detail with reference to FIG. 6. As shown in the figure, a column for vehicle codes may be generated in the common table 30 in a partially predefined sequence, such as a numerical sequence starting with a first code (Code 1) and ending with a last code (Code N). In the illustrated embodiment, the central column includes vehicle identifications corresponding to vehicles extended from a first vehicle (Vehicle A) to a last vehicle (Vehicle Z). As a plurality of codes and vehicles may be selected, a given remote start controller 18 may be used for many vehicles.

In the table 30 shown in the figure, the last or rightmost column is a vehicle electronic element data or message corresponding to a related vehicle and code. This vehicle electronic element message is extended from the first vehicle electronic element message $DM_{1A}$ to the last vehicle electronic element message $DM_{NZ}$. The message may be many different types, such as open or close of the driver door, open or close of the hood, shock sensor trigger, brake pre-indication display, Park gear shift selector, and the like.

For example, the common table 30 includes a blocked row schematically showing matching with code 572. This code is for Ford Taurus and indicates that the driver door is open. This type of data may be useful for remote start. The CPU 181 reads the code of the router 11, compares the read code with the stored code, and determines whether the codes match. Since some or all of the codes could be buffered when the codes are received thereafter, the CPU 181 compares the codes using the table 30. In another embodiment, individual bits or a block thereof may be compared when they are received.

An optional embodiment of the common table 30 is described hereinafter with reference to FIG. 7. In this case, the entire or part of the common table 30' may be regarded as being parsed or partitioned into a plurality of vehicle table sections. In the illustrated embodiment, a first table section is for vehicle A, and the last section is for vehicle Z. This embodiment also shows the driver door for Ford Taurus, which is matched from the read signal from the router 11. What is important in this embodiment is that this is only for a code for initial setting or initial learning period. A trained vehicle needs to be compared with the read code thereafter. Accordingly, time saving can be realized.

Figure 6:
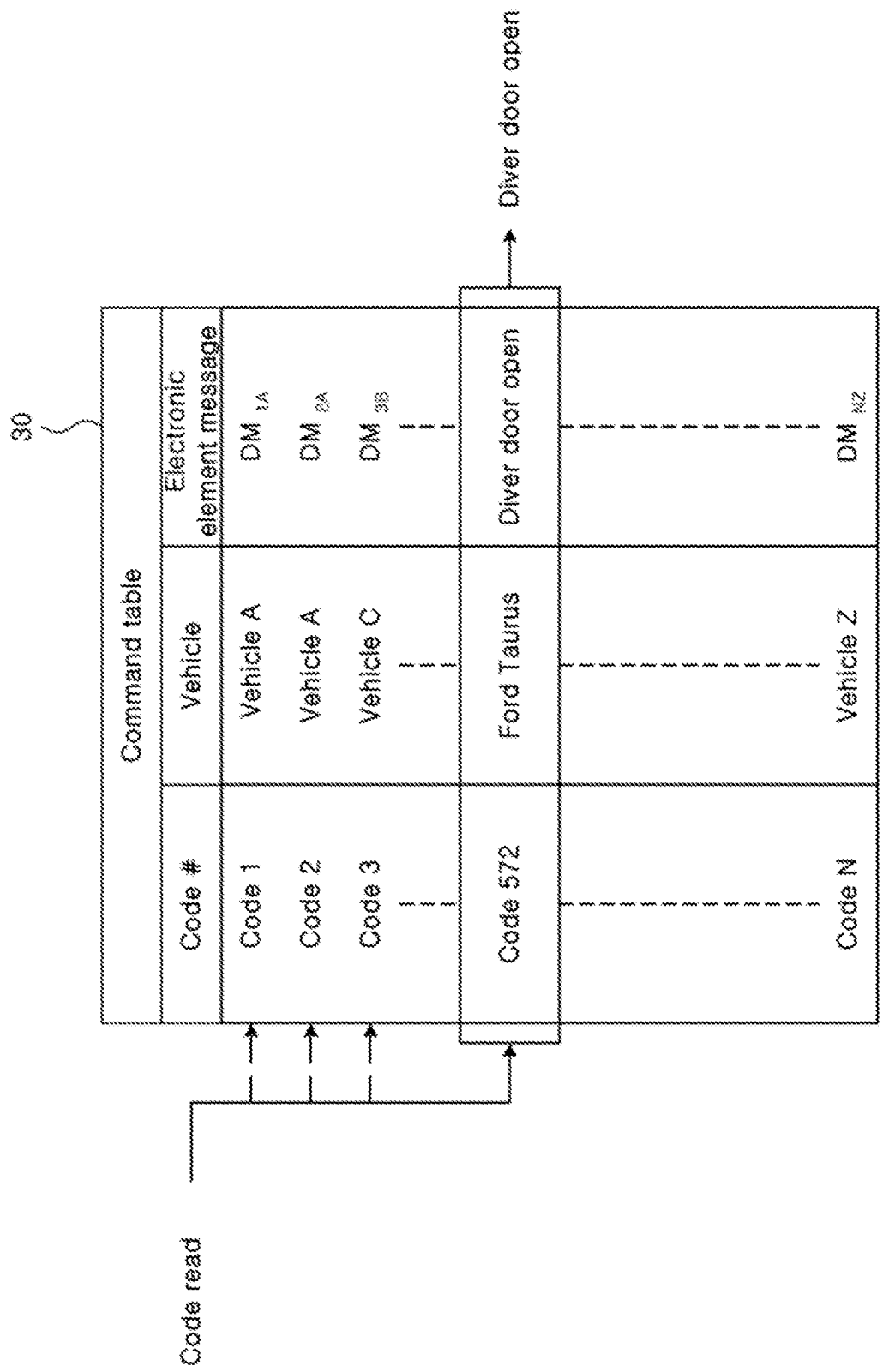
FIG. 6 is a view showing an example of processing, by the remote start control device of FIG. 4, a code read from the router.
Figure 7:
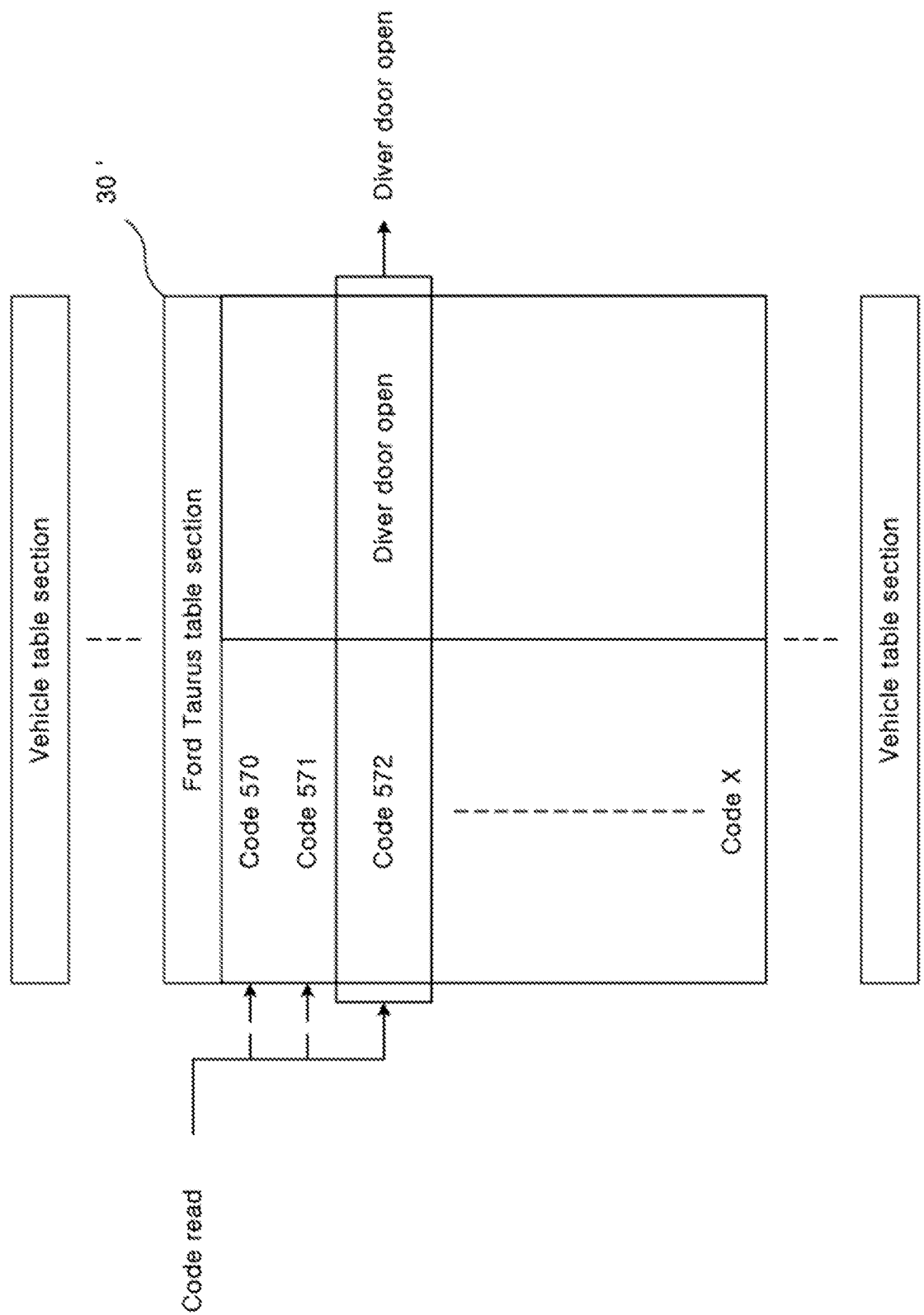
FIG. 7 is a view showing another example of processing, by the remote start control device of FIG. 4, a code read from the router.
Figure 8:
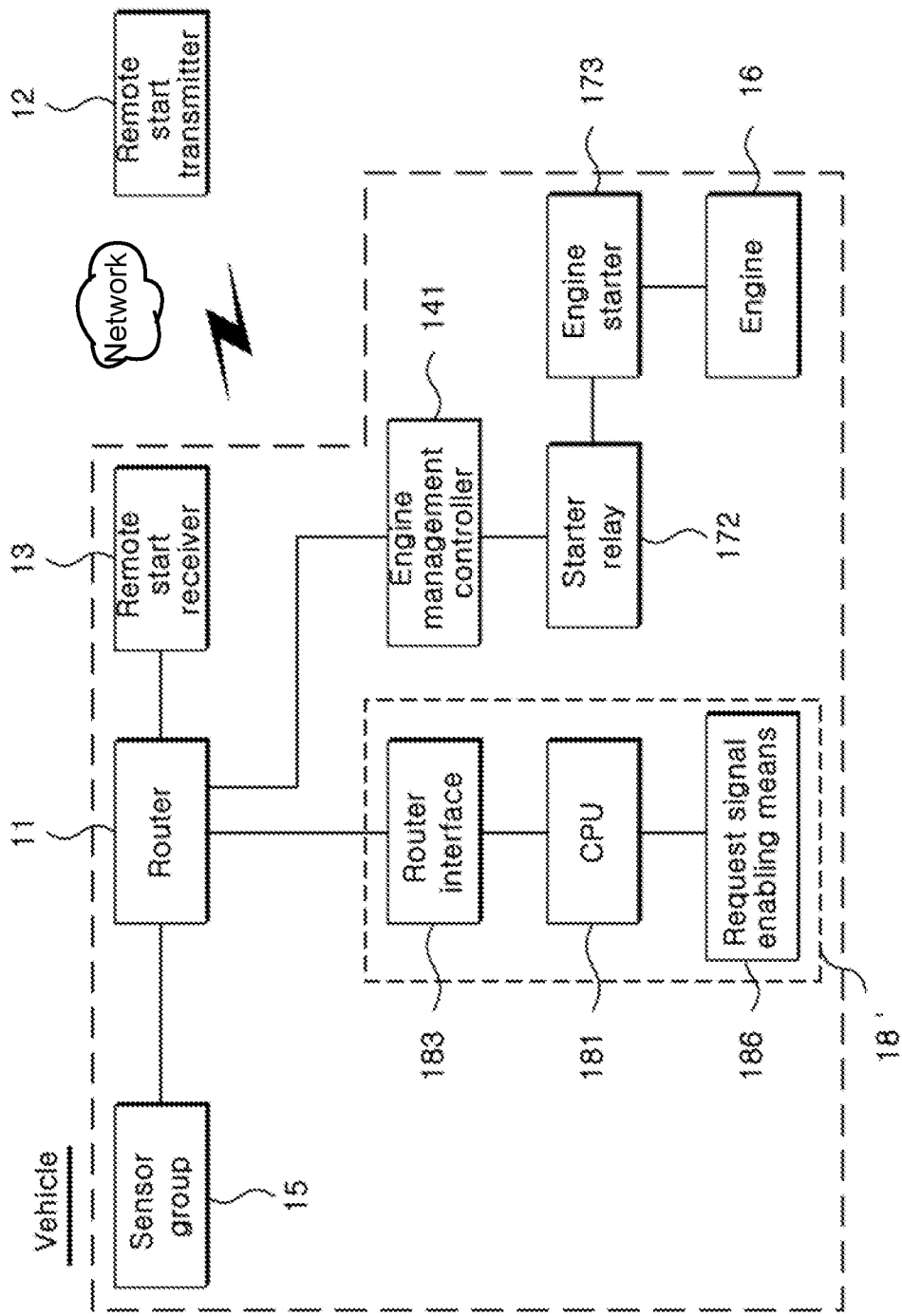
FIG. 8 is a block diagram showing a control circuit of a remote start control device connected to a router as a second application example of the present invention.

Those skilled in the art will recognize that the tables 30 and 30' of FIGS. 6 and 7 are shown as an example from the configuration of a plurality of possible lookup tables that may be used according to the present invention. Other configurations are also considered by the present invention.

Since it may also be desirable to re-install the remote start controller 18 in another vehicle, the remote start controller 18 may be reset, and another vehicle may be trained or configured during the initial setup. This concept is generally described in the related parent U.S. patent application Ser as an implementation of a request signal enabling function or feature.

The request signal enabling is further described below with reference to FIGS. 8 to 13. Multi-vehicle compatibility may be provided by including a request signal enabling means 186 in the remote start controller 18'. This function or feature is intended to enable operation by using a request signal set for a corresponding requesting vehicle from a plurality of signal sets. It provides compatibility of different vehicles with a plurality of different vehicles.

The remote start controller 18' does not necessarily represent or include the hardwire interface 182 described above. Rather, in this embodiment, the remote start function is implemented by the remote start controller 18' through communication with the engine management controller 141, and the engine management controller 141 is directly connected to the starter relay 172.

Figure 9:
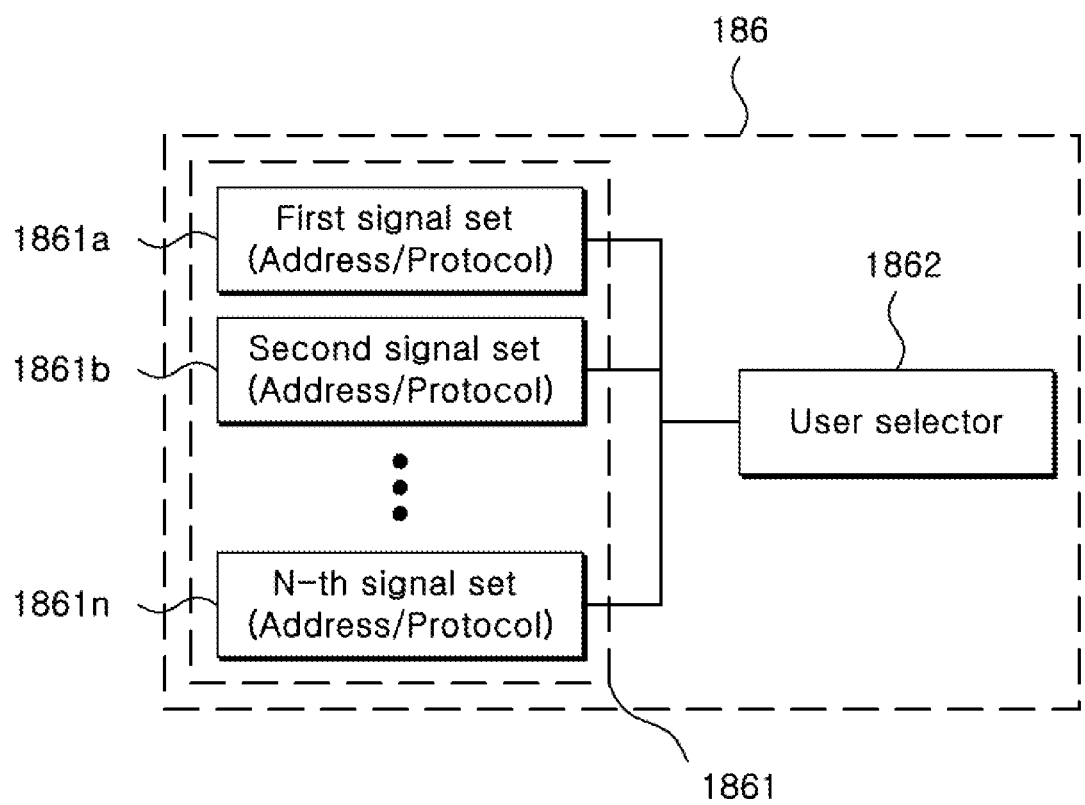
FIG. 9 is a view showing an example of a request signal enabling part of the remote start control device of FIG. 8.

Referring to FIG. 9 now, a first embodiment of the request signal enabling means 186 is described in FIG. 9. The request signal enabling means 186 is for the remote start controller 18' to operate using a request signal set for a requesting vehicle among a plurality of possible signal sets for different vehicles. Here, the term different vehicles may include vehicles of different manufacturers, different models, or even different trim levels of the same manufacturer and model. Accordingly, the request signal enabling means 186 allows the remote start controller 18', i.e., the CPU 181 and the router interface 183, to communication with the sensor group 15, the engine management controller 141, or other vehicle electronic elements through the router 11. The CPU 181 may start the vehicle engine 16 in response to the remote start receiver 13 receiving a remote start signal from the remote start transmitter 12.

As shown in FIG. 9, an embodiment of the request signal enabling means 186 may preferably include a memory 1861 for storing a plurality of signal sets 1861a, 1861b and 1861n for different vehicles, and a selection means for selecting a request signal set from the plurality of different signal sets. Storing a signal set means storing information or data needed for generating a request signal by the router 11. The memory 1861 may include a vehicle electronic element address memory means for storing signals of a plurality of different sets indicating different vehicle electronic element addresses (MAC addresses) for different vehicles. Optionally or additionally, the memory means may include a protocol memory means for storing a plurality of different protocols for different vehicles.

As shown in FIG. 9, the selection means may include a user selection means 1862 that allows a user to select a request signal set. A keypad or other input means may be used to allow the user to select a request signal set for his or her vehicle. For example, a valet switch or other control switches such as the remote start controller 18 may also be handled by the user to select a request signal set. The user may select a request signal set by entering a unique digital code similar to signal selection for universal remote control of home appliances. Other techniques that allow the user to select a request signal set from a plurality of stored sets are also considered by the present invention.

Figure 10:
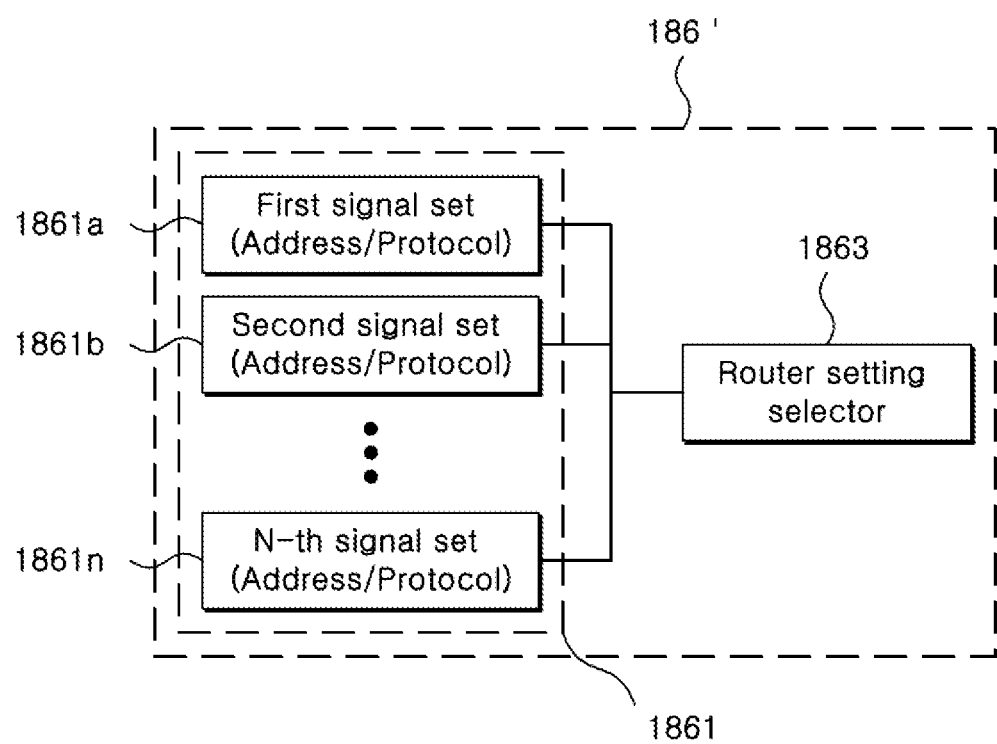
FIG. 10 is a view showing another example of a request signal enabling part of the remote start control device of FIG. 8.

Further referring to FIG. 10 now, in FIG. 10, another embodiment of the request signal enabling means 186' is described according to the remote start controller 18' of the present invention. In this embodiment, the selection means may include a router setting selector 1863 for determining a request signal set based on a signal. For example, the router setting selector 1863 may determine a request signal set based on a sensed voltage level or timing of the signal pulse of the router. Since other components of the request signal enabling means 186 of this embodiment are similar to those described in FIG. 9, further description thereof will be omitted.

Figure 11:
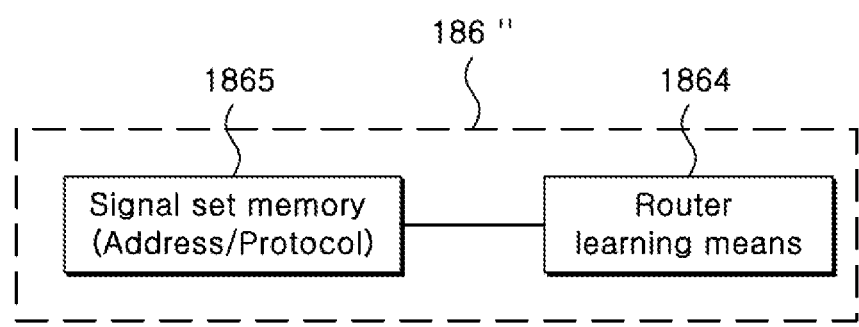
FIG. 11 is a view showing still another example of a request signal enabling part of the remote start control device of FIG. 8.

Still another embodiment of the request signal enabling means 186" according to the present invention will be described with reference to FIG. 11. In this illustrated embodiment, the request signal enabling means 186" includes a signal set memory 1865 operatively connected to the router learning means 1864 shown in the figure. The router learning means 1864 may determine and store a protocol and/or a MAC address for a vehicle electronic element in the signal set memory 1865. For example, the router learning means 1864 may allow a user to handle various vehicle electronic elements and store a request signal set. Since other components of the request signal enabling means 186" are similar to those described in FIG. 9, further description thereof will be omitted.

Figure 12:
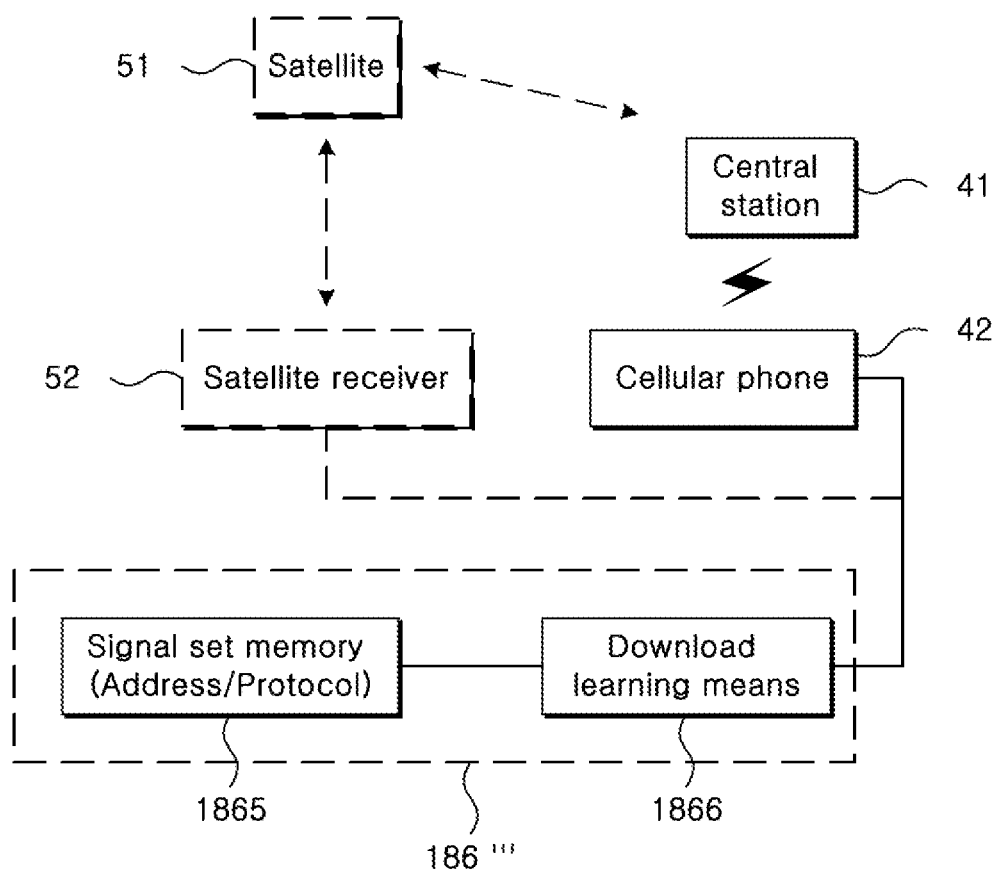
FIG. 12 is a view showing still another example of a request signal enabling part of the remote start control device of FIG. 8.

Still another embodiment of the request signal enabling means 186''' will be described with reference to FIG. 12. The request signal enabling means 186''' includes a signal set memory 1865 operably connected to a download learning means 1866 schematically shown in the figure. For example, it includes an interface connected to the illustrated vehicle cellular phone 42 to allow learning or download of a request signal set from a remote or central monitoring and control station 41. The request signal set may also be alternately trained from the remote or central monitoring and control station 41 through a satellite link provided by a satellite 51, a vehicle-mounted satellite receiver 52, and related antennas. The download learning means 1866 and other request signal enabling means may be implemented by software in the CPU of the remote start controller 186''' or a separate microprocessor or circuit.

Figure 13:
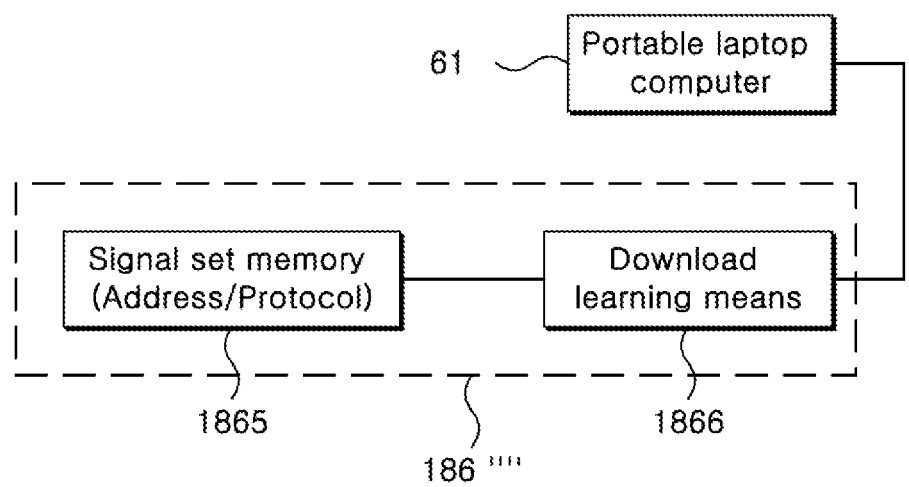
FIG. 13 is a view showing still another example of a request signal enabling part of the remote start control device of FIG. 8.

Further referring to FIG. 13 now, still another variation of programming, learning or downloading of the download learning means 1866 is described. In this variation, the download learning means 1866 is temporarily connected to a computer such as the portable laptop computer 61 shown in the figure. The connection may be made through a wired or wireless communication link. Of course, in this embodiment, the request signal enabling means 186'''' may be programmed in the vehicle or before being installed in the vehicle.

Returning to and referring to FIG. 4 again, the concept of a command signal for driving the router 11 using a plurality of signal codes to provide multi-vehicle compatibility is reviewed again. In another embodiment, the remote start controller 18 may be divided into two sections or parts. More specifically, multi-vehicle compatibility may be provided by a multi-vehicle compatible adapter including a CPU 181, a command signal memory 184, and optionally a router interface 183. The adapter may also include its own housing. One scenario in which the adapter approach like this may be particularly useful is to adapt an existing remote start controller 18 to operate through the router 11. Since the router 11 technique progresses slowly in steps, suppliers may add the adapter like this to an existing controller when automobile manufacturers provide conventional remote start control devices for existing vehicles and a vehicle requests an interface to the router 11. Alternatively, the remote start controller 18 may be provided by a conventional remote start controller, or the remote start may be, for example, a supportive output of a vehicle security controller.

A similar concept may be extended to another communication direction, i.e., a multi-vehicle compatible adapter from the router 11 to one or more vehicle electronic elements. Such an adapter will include the code lookup memory 185 described above. In addition, since operation of the multi-vehicle compatible adapter may be based on the description provided above in relation to FIGS. 4 to 6, no further discussion is required. Of course, these adapters may be used independently, may be used together, or may be combined into a single unit.

The embodiment of the method of the present invention is to remotely start the vehicle engine 16 of a vehicle including the router 11 and at least one or more vehicle electronic elements 141 to 143 and 151 to 154 related to start of the vehicle engine 16. This method preferably includes the steps of receiving a signal, by a vehicle, from the remote start transmitter 12, connecting the remote start controller 18 to the router 11 to communicate with at least one vehicle electronic element, and starting the vehicle using the remote start controller 18 to start the vehicle engine 16 based on the signal received from the remote start transmitter 12 and communication with at least one vehicle electronic element through the router 11.

As described above, according to the Ethernet-based vehicle control system and method of present invention, since a third-party module can be freely installed and replaced based on Ethernet, various services related to a vehicle may be realized through a vehicle external network.

The technical spirit of the present invention has been described above through several embodiments.

It is apparent that those skilled in the art may diversly modify or change the embodiments described above from the description of the present invention. In addition, although it is not explicitly shown or described, it is apparent that those skilled in the art may make modifications of various forms including the technical spirit of the present invention from the description of the present invention, and this still belongs to the scope of the present invention. The embodiments described above with reference to the accompanying drawings are described for the purpose of describing the present invention, and the scope of the present invention is not limited to these embodiments.

What is claimed is:

1. An Ethernet-based vehicle control system, comprising:
   a router for connecting a vehicle internal network and a vehicle external network;
   a vehicle electronic element connected to and communicating with the router; and
   a third-party module configured to be installed on a vehicle to control the vehicle electronic element, wherein:
   the vehicle electronic element is configured to communicate with the router via the third-party module;
   the third-party module is controlled by a remote controller through the vehicle external network, wherein the remote controller is configured to send and receive input and output signals respectively to the vehicle electronic element via the third-party module; and
   the third-party module is configured to clone a Media Access Control (MAC) Address of the vehicle electronic element in response to the input and output signals for performing at least one of:
   matching and converting the input and output signals to directly control a corresponding vehicle electronic element;
   bypassing the input and output signals; and
   overriding the input and output signals.

2. The system according to claim 1, wherein the third-party module is a remote start control device.

3. The system according to claim 2, wherein the remote start control device includes:
   a remote start receiver for receiving a remote start signal transmitted from a remote start transmitter through the vehicle external network; and
   a remote start controller for controlling engine start through communication with at least one vehicle electronic element related to engine start of the vehicle, wherein the remote start controller is connected to the remote start receiver and responds to the remote start receiver.

4. The system according to claim 2, wherein the remote start control device includes:
   a remote start receiver for receiving a remote start signal transmitted from a remote start transmitter through the vehicle external network;
   a remote start controller for controlling engine start through communication with at least one vehicle sensor related to engine start of the vehicle, wherein the remote start controller is connected to the remote start receiver and responds to the remote start receiver.

5. The system according to claim 2, wherein the remote start control device includes:

a remote start receiver for receiving a remote start signal transmitted from a remote start transmitter through the vehicle external network; and a remote start controller for controlling engine start through communication with at least one vehicle controller related to engine start of the vehicle, wherein the remote start controller is connected to the remote start receiver and responds to the remote start receiver.

6. An Ethernet-based vehicle control method, the method for controlling a vehicle using:

a third-party module configured to be installed on a vehicle including a router for connecting a vehicle internal network and a vehicle external network; and a vehicle electronic element connected to and communicating with the router, to control the vehicle electronic element, wherein:

the third-party module is configured to establish communication between the vehicle electronic element and the router;

the third-party module is controlled by a remote controller through the vehicle external network, wherein the remote controller is configured to send and receive input and output signals respectively to the vehicle electronic element via the vehicle internal network; and the third-party module configured to clone a Media Access Control (MAC) Address of the vehicle electronic element in response to the input and output signals for performing at least one of:

matching and converting the input and output signals to directly control a corresponding vehicle electronic element;

bypassing the input and output signals; and overriding the input and output signals.

7. The method according to claim 6, wherein the third-party module is formed between the router and the vehicle electronic element to be controlled by the remote controller.

8. The method according to claim 7, wherein the third-party module converts a packet transmitted from the vehicle external network into a signal required by the vehicle electronic element in response to the packet and transmits the signal to the vehicle electronic element so that the vehicle electronic element performs a corresponding operation or the third-party module directly controls the vehicle electronic element in response to the packet transmitted from the vehicle external network, or the third-party module bypasses input and output packets to the vehicle electronic element or the vehicle external network as they are, or the third-party module ignores the packet output from the vehicle electronic element and modulates and transmits a corresponding packet to the vehicle electronic element and the vehicle external network, or contrarily deletes the packet inputted into the vehicle electronic element and modulates and transmits the packet to the vehicle electronic element.

9. The method according to claim 7, wherein the third-party module includes:

a remote start receiver for receiving a remote start signal transmitted from a remote start transmitter through the vehicle external network; and a remote start controller for controlling engine start through communication with at least one vehicle electronic element related to engine start of the vehicle, wherein the remote start controller is connected to the remote start receiver to perform remote start control in response to the remote start receiver.

10. The method according to claim 9, wherein the remote start control includes the steps of:

receiving a vehicle signal from the remote start transmitter;

controlling engine start, by the remote start controller, through communication with at least one vehicle; and starting a vehicle engine based on the signal received from the remote start transmitter and based on communication with at least one vehicle electronic element related to engine start of the vehicle.

* * * * *